(12) United States Patent
Oskarsson

(10) Patent No.: US 7,452,070 B2
(45) Date of Patent: Nov. 18, 2008

(54) SINGLE LENS PINCE-NEZ

(75) Inventor: Kajsa Oskarsson, Stockholm (SE)

(73) Assignee: Trendus World Ltd. (HK)

( * ) Notice: Subject to any disclaimer, the term of this patent is extended or adjusted under 35 U.S.C. 154(b) by 99 days.

(21) Appl. No.: 11/621,174

(22) Filed: Jan. 9, 2007

(65) Prior Publication Data

US 2008/0165318 A1     Jul. 10, 2008

(51) Int. Cl.
*G02C 9/02* (2006.01)
*G02C 1/00* (2006.01)

(52) U.S. Cl. .............................. 351/59; 351/65; 351/69

(58) Field of Classification Search .................. 351/41, 351/59, 64–82
See application file for complete search history.

(56) References Cited

U.S. PATENT DOCUMENTS 2,478,921 A * 8/1949 Hansen ........................ 351/71
4,880,302 A   11/1989 Meillet
5,815,234 A * 9/1998 Dileo ........................... 351/59

FOREIGN PATENT DOCUMENTS

| CA | 2382987 A1 | 10/2003 |
| DE | 3844077 A1 | 7/1990 |
| DE | 10108176 A1 | 6/2004 |

* cited by examiner

*Primary Examiner*—Huy K Mai
(74) *Attorney, Agent, or Firm*—Jeffrey S. Melcher; Manelli Denison & Selter PLLC

(57) ABSTRACT

A single lens pince-nez, comprising a bridge member (11) adapted to extend over the bridge of the nose of a person and engage the sides of the bridge of the nose, and a single lens (10) attached to the bridge member (11) in a position located in front of one eye of the person when the person wears the pince-nez, is very suitable for use as make-up "glasses", since it does not obstruct the applying of make-up on one side of the face of the wearer of the "glasses", and is comfortable to wear thanks to its low weight. By selecting a high refractive index glass for the lens (10) and a beta titanium alloy for the bridge member (11), the weight can by reduced even more. Preferably, the single lens (10) is pivotally attached to the bridge member (11), so that it can be swung vertically or horizontally from one eye to the other.

14 Claims, 3 Drawing Sheets

SINGLE LENS PINCE-NEZ

TECHNICAL FIELD

The present invention relates to a single lens pince-nez comprising a bridge member arranged to extend over the bridge of the nose of a person and engage, at least the sides of, the bridge of the nose to position the pince-nez, and a single lens attached to the bridge member in a position located in front of one eye of the person when the person wears the pince-nez.

BACKGROUND ART

Typically a person has to take off her glasses to apply eye drops or apply make-up to her face, especially to put on eye shadow and to improve her eyelashes. But, with her glasses off, she might have difficulty clearly seeing her face in a mirror to apply the eye drops or the make-up, irrespective of whether she is far-sighted or very near-sighted. To solve this problem, a great variety of cosmetic or make-up glasses have been proposed.

U.S. Pat. No. 3,495,898 is representative is representative of several prior art concepts for facilitating for an eyeglass wearer to apply make-up. The disclosed eyeglasses comprise a body member, to which a pair of temple members is attached. The body portion is supported either against the wearer's forehead or via a pair of legs against the sides of the bridge of her nose. A lens is mounted in a vertical holder that is mounted to be slidable along the length of the body member, so that the lens can be shifted from a position in front of one eye to another position in front of the other eye. In this way obstructing portions of the eyeglasses are minimized (compared to traditional glasses) that facilitates an application of make-up around one eye, while it is possible to see perfectly with the other eye.

U.S. Pat. No. 3,840,294 discloses make-up glasses having the body member located quite a distance below the eyes and two lenses pivotally attached to the body member, so that each lens can be turned down to facilitate the application of make-up around the eye. A similar solution is disclosed in U.S. Pat. No. 6,135,593, where the two pivotable lenses are magnifying glasses. By making the temple members long and using large fixed lenses as illustrated in U.S. Pat. No. 7,101,038, the body member may be placed almost at the tip of the nose, whereby there is enough space between each eye and the associated fixed lens to permit make-up around the eye. Two other suggestions using long curved temple members and fixed lenses are disclosed in U.S. Pat. No. 6,010,215 and U.S. Pat. No. 6,439,718. Here a long support leg extends from the middle portion of the body member to the bridge of the nose to create sufficient space between the fixed lenses and the eyes to permit make-up around the eyes.

Another type of make-up glasses is disclosed in U.S. Pat. Nos. 4,880,302 and 5,561,481. Here a single lens is pivotally attached to a bridge piece of the body member. In '302, the single lens is mounted on a vertical pivot axis and can be turned aside horizontally from one eye to the other. In '481, the single lens is mounted on a horizontal pivot axis and can be swung vertically from one eye to the other, cf. also U.S. Pat. No. Des. 304,950.

A variation of the latter concept is disclosed in U.S. Pat. Nos. 6,746,116 and 6,761,450, both of which relate to combination reading and make-up glasses. The single lens is divided horizontally into two identical halves, which are pivotable independently of each other. When both halves are located in front of one eye, the other eye is available for make-up, and when each of the two halves is locate in front of its associated eye, the glasses work as reading glasses.

Still another type is disclosed in U.S. Pat. No. 4,405,213. Basically these glasses are ordinary glasses usually worn by the person. Both of the two lenses are mounted in a frame, and each frame is slidably connected to the bridge piece of the eyeglasses, so that each lens can be pushed down to apply make-up around the eye. When the make-up is finished, the eyeglasses may be worn normally.

All of these solutions to the problem of making space available between an eyeglass lens and the eye for the application of make-up around the eye suffer from obstructing temple members.

DISCLOSURE OF THE INVENTION

The main object of the present invention is to provide make-up "glasses" that do not obstruct the applying of make-up on one side of the face of the wearer of the "glasses".

This object is achieved by providing a single lens pince-nez, comprising a bridge member arranged to extend over the bridge of the nose of a person and engage, at least the sides of, the bridge of the nose to position the pince-nez, and a single lens attached to the bridge member in a position located in front of one eye of the person when the person wears the pince-nez.

By definition a pince-nez has no temple members. Consequently, with a single lens pince-nez, one half of the face is readily available for applying make-up. There is no obstruction by temple members or the like, and the single lens covers one eye only, so there is nothing obstructing the wearer when applying make-up around the other eye, which is a significant advantage especially in relation to applying a foundation and other kind of cosmetics that preferably should be applied by uninterrupted strokes.

Preferably, the bridge member includes a bridge piece and two spring-loaded nose pads, advantageously silicone pads, one for each side of the nose, attached to the bridge piece. Thereby, it will be easier for the single lens pince-nez to remain in a selected position on the nose of the wearer and be worn without discomfort. Alternatively the whole bridge, or at least a large portion thereof, is covered by silicone to increase comfort.

Advantageously, the bridge piece includes slender portions of a strong and resilient material to provide for spring action at each end of the bridge piece. For example, if using separate nose pads each of the nose pads may be mounted at the free end of such a slender portion of the bridge piece, wherein the slender portion is sufficiently resilient to provide the spring action. The same action may of course be obtained using a continuous silicon pad. This provides a less complicated design than if separate springs were provided.

To reduce the weight of the pince-nez, the single lens consists substantially of glass having a refractive index on the order of 1.9. When a high refractive index glass is used, the lens can be thinner and, thus, weigh less.

Preferably, the single lens pince-nez further comprises an arm having two ends, one end being pivotally attached to the bridge member and the other end of the arm being attached to the single lens, whereby the single lens may be pivoted from a first position in front of one eye of the person to a second position in front of the other eye of the person.

To reduce the weight of the pince-nez and make the pince-nez more comfortable to wear, preferably also the arm consists of a beta titanium alloy.

The pivotal attachment may include a substantially horizontal pivotal axis, so that the pivotal movement of the single lens when a person carries the pince-nez takes place in a substantially vertical plane. Alternatively, the pivotal attachment includes a substantially vertical pivotal axis, so that the pivotal movement of the single lens when a person carries the pince-nez takes place in a substantially horizontal plane.

To reduce the weight of the pince-nez, the single lens suitably is frameless.

A further reduction of the weight of the pince-nez is obtained if the bridge piece preferably consists of a beta titanium alloy, a thin structure of stainless steel or a suitable composite plastic of high strength. A reduced weight makes the pince-nez more comfortable to wear.

BRIEF DESCRIPTION OF THE DRAWINGS

In the following, the invention will be described in more detail with reference to preferred embodiments and the appended drawings.

MODES FOR CARRYING OUT THE INVENTION

Figure 1A:
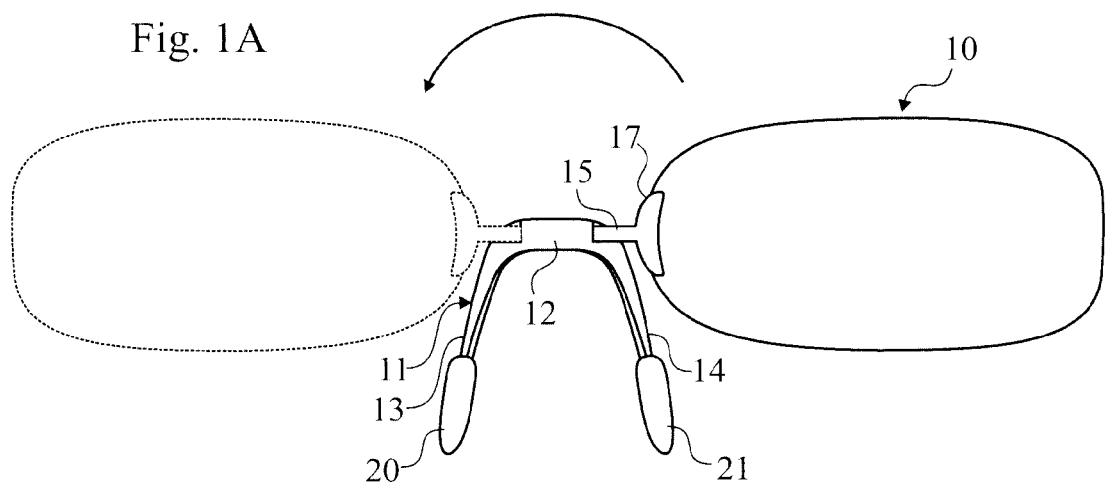
FIG. 1A is a front view of one preferred embodiment of a single lens pince-nez in accordance with the present invention.
Figure 1B:
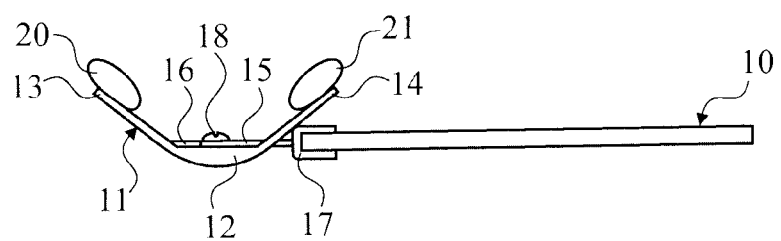
FIG. 1B is a view from above of the single lens pince-nez of FIG. 1A.
Figure 1C:
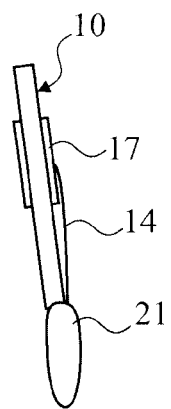
FIG. 1C is a side view of the single lens pince-nez of FIGS. 1A and 1B.

FIGS. 1A, 1B, and 1C show a preferred embodiment of a single lens pince-nez in accordance with the present invention. The single lens pince-nez comprises a bridge member 11 adapted to extend over the bridge of the nose of a person and engage the sides of the bridge of the nose, and a single lens 10 attached to the bridge member 11 in a position located in front of one eye of the person when the person wears the pince-nez.

A pince-nez has no temple members. Consequently, when a single lens pince-nez is positioned on the bridge of the nose of a wearer, one half of the face is readily available for applying make-up. There is no obstruction by temple members or the like, and the single lens covers one eye only, so there is nothing obstructing the wearer when applying make-up around the other eye.

Preferably, the bridge member 11 includes a bridge piece 12 and two spring-loaded nose pads 20, 21, advantageously silicone pads, one for each side of the nose, attached to the bridge piece 12. Thereby, it will be easier for the single lens pince-nez to remain in a selected position on the nose of the wearer and be worn without discomfort.

Advantageously, each of the nose pads 20, 21 is mounted at a free end of a slender portion 13, 14 of the bridge piece 12, and the slender portion 13, 14 is sufficiently resilient to provide the spring action. This design with a relatively rigid bridging portion and slender, resilient portions 13, 14 is less complicated than if separate springs, e.g. coil springs, which also could be used in an embodiment not shown, were provided for providing the tension that presses the nose pads 20, 21 against the sides of the bridge of the nose and keeps the single lens pince-nez on the nose. In the embodiment illustrated in FIG. 1, the bridge piece 12 is substantially of diverging inverted U-shape. By selecting dimensions and materiel of the bridge piece 12 and its slender portions 13, 14 it is easy to get the desired spring properties. Of course, if desired, it is possible in an embodiment not shown to make the bridging portion of the bridge piece 12 resilient and the slender portions 13, 14 rigid or resilient. In such a case, it may be advantageous to make the bridging portion more C-shaped, like in a common type of $19^{th}$ century pince-nez.

To reduce the weight of the pince-nez, the bridge piece 12 presents a light weight structure preferably presenting a kind of frame structure including a strong and resilient, preferably relatively light weight, metal, e.g. made from stainless steel and/or of a beta titanium alloy. A reduced weight makes the pince-nez more comfortable to wear. Beta or near beta titanium alloys are fully heat treatable, generally weldable, capable of high strengths, and possess good creep resistance up to intermediate temperatures.

Excellent formability can be expected in the beta titanium alloys in the solution treated condition. Beta-type titanium alloys have good combinations of properties in sheet, as fasteners and are ideal for spring applications. Some alloys offer uniform property levels through heavy sections. Typical beta titanium alloys suitable for use in the present invention include:

| | |
|---|---|
| Ti3Al8V6Cr4Mo4Zr ASTM Grade 19 | Ti10V2Fe3Al AMS 4983, 4984, 4987 |
| Ti15Mo3Nb3Al2Si ASTM Grade 21 | Ti15V3Cr3Sn3Al AMS 4914 |

Preferably, the single lens pince-nez further comprises an arm 15 having two ends 16, 17, one end 16 being pivotally attached to the bridge member 11 and the other end 17 of the arm 15 being attached to the single lens 10, whereby the single lens 10 may be pivoted from a first position in front of one eye of the person to a second position in front of the other eye of the person.

To reduce the weight of the pince-nez and make the pince-nez more comfortable to wear, the arm 15 presents a light weight structure, preferably also the arm 15 is made from stainless steel or a beta titanium alloy, suitably the same one as is used in the bridge piece 12. In an alternative embodiment (not shown) the arm 15 may be telescopically arranged to allow for easy adjustment of the position of the lens 10.

The pivotal attachment may include a substantially horizontal pivotal axis 18, so that the pivotal movement of the single lens 10, when a sitting or standing person carries the pince-nez, takes place in a substantially vertical plane. As shown in FIGS. 1A and 1B, the substantially horizontal pivotal axis may be a screw 18, which is located centrally in the cavity of the generally diverging inverted U-shaped bridge piece 12 and extends through an eye formed in the one end 16 of the arm 15 and into the material of the bridging portion of the bridge piece 12. A slot is cut from above into the bridge piece 12, substantially down to the level of the screw 18, so that the arm 15 that holds the single lens 10 will rest substantially horizontally irrespective of whether the single lens 10 is swung in a substantially horizontal plane to a first end position in front of the left hand eye or a second end position in front of the right hand eye of the person. The other end 17 of the arm 15 is forked to receive the single lens 10 between the tins of the fork. The grip of the tins against opposite sides of the single lens 10 may be improved by any suitable glue.

Figure 2A:
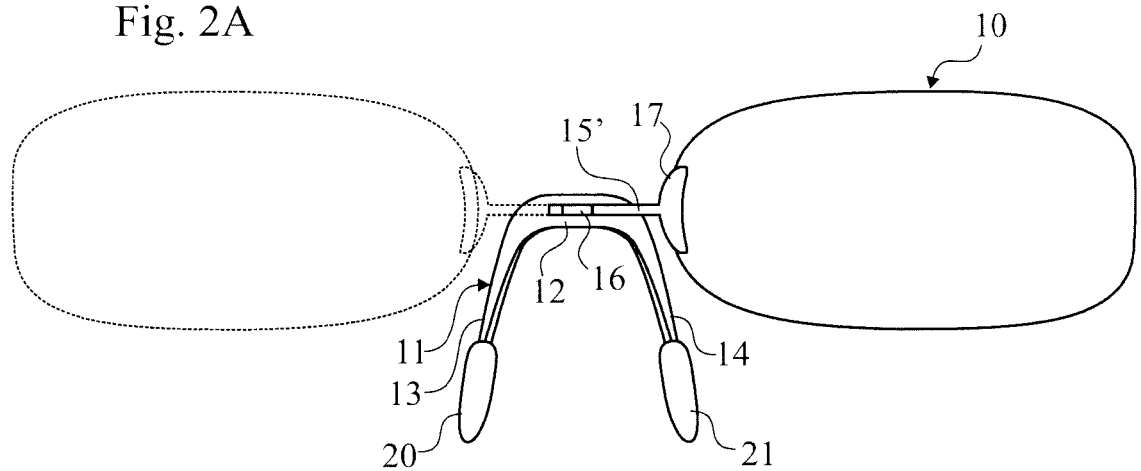
FIG. 2A is a front view of another embodiment of a single lens pince-nez in accordance with the present invention.
Figure 2B:
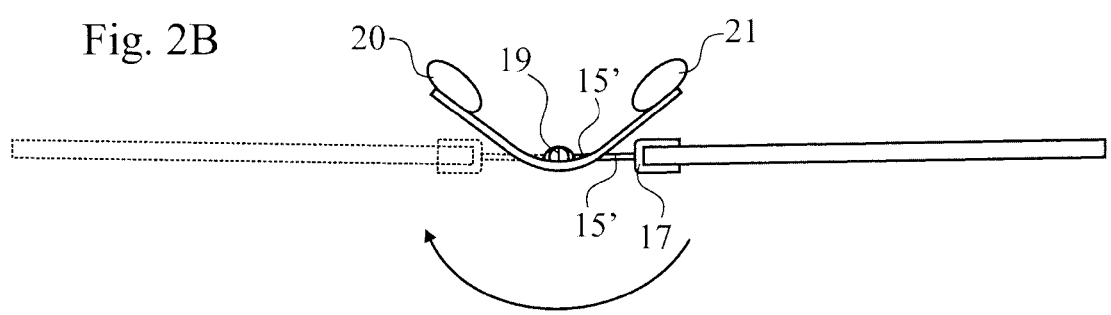
FIG. 2B is a view from above of the single lens pince-nez of FIG. 2A.
Figure 2C:
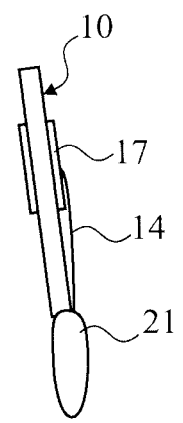
FIG. 2C is a side view of the single lens pince-nez of FIGS. 2A and 2B.

In the alternative embodiment shown in FIGS. 2A, 2B, and 2C, the pivotal attachment includes a substantially vertical pivotal axis 19, so that the pivotal movement of the single lens 10, when a sitting or standing person carries the pince-nez, takes place in a substantially horizontal plane. Here, the substantially vertical pivotal axis may be a screw 19, which is located centrally in the cavity of the generally diverging inverted U-shaped bridge piece 12 and extends downwards through an eye formed in the one end 16 of the arm 15' and into material added on the rear side of the bridging portion of the bridge piece 12. A slot is cut from the front side into the bridge piece 12, substantially into the screw 19, so that the arm 15' that holds the single lens 10 will rest substantially horizontally irrespective of whether the single lens 10 is swung in a substantially vertical plane to a first end position in front of the left hand eye or a second end position in front of the right hand eye of the person. Like in FIG. 1, the other end 17 of the arm 15' is forked to receive the single lens 10 between the tins of the fork, and the grip of the tins against opposite sides of the single lens 10 may be improved by any suitable glue.

While the embodiment shown in FIG. 1 permits the use of ordinary eyeglasses lenses that mostly lenses are meniscus in shape, it requires that the arm 15 is attached along the horizontal symmetry axis of the lens 10. With the embodiment of FIG. 2, the contrary applies. The arm 15' may be attached to the lens 10 at a position above the center in vertical direction thereof, and the lens 10 must not have the shape of a meniscus but be symmetrical in cross section in order to give the desired correction of the sight independent of from which side of the lens 10 an object is viewed.

As described above, the weight of the single lens pince-nez is reduced by making the bridge piece 12 and the arm 15 or 15' from a beta titanium alloy. To reduce the weight of the pince-nez still more, the single lens 10 suitably is frameless.

A further reduction of the weight of the pince-nez is obtained if the single lens 10 consists substantially of glass having a refractive index $n_d$ on the order of 1.9. Ordinary optical crown glass, such as B270, has a refractive index $n_d$ of 1.52288 and a density of 2.55 g/cm$^3$ (the heaviest corrective lens material in common use, today). When a high refractive index glass is used, the lens can be thinner and, thus, weigh less. As an example of a suitable material we can mention the light weight high refractive index eyeglass material LAH80 from Ohara, Inc., Kanagawa, Japan. Of course, if desired, it is also possible to make the single lens 10 from a suitable polymeric optical material. Irrespective of whether glass or polymer is used as lens material, it is recommendable to apply scratch resisting and/or anti-reflex coatings in a manner well known in production of eyeglasses.

Figure 3A:
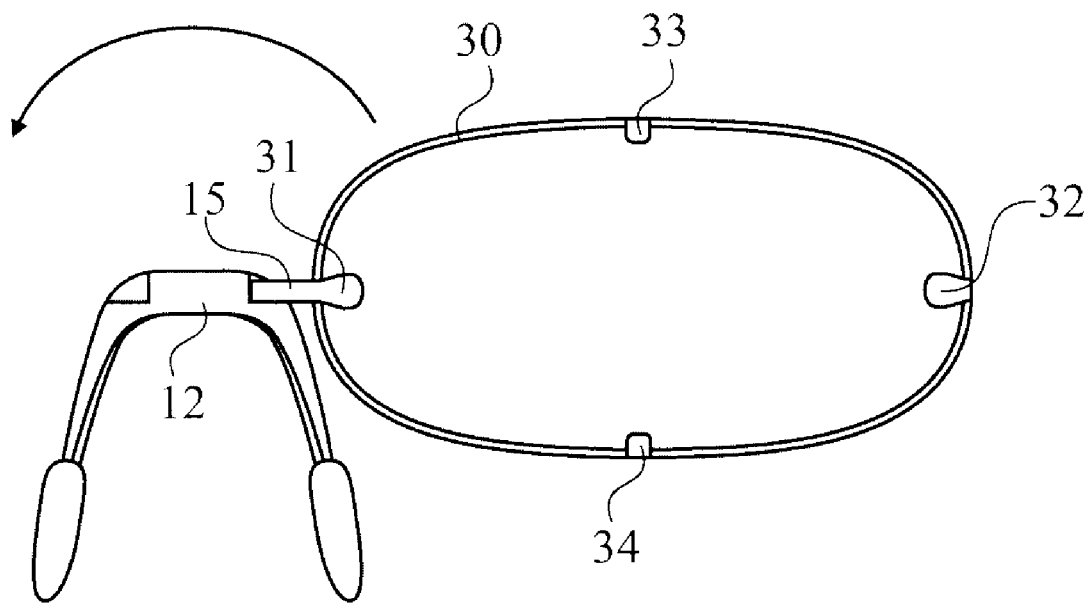
FIG. 3A is a front view of still another embodiment of a single lens pince-nez in accordance with the present invention.
Figure 3B:
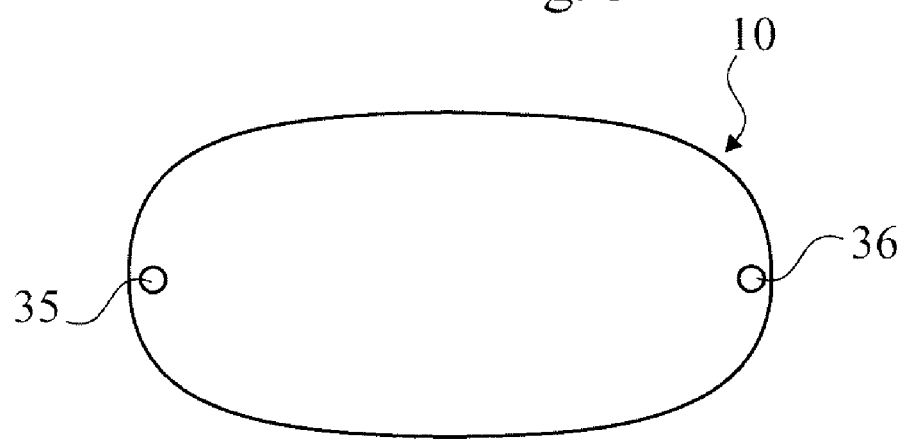
FIG. 3B is a front view of a lens intended for pince-nez in accordance with FIG. 3A.

In FIGS. 3A and 3B there is shown a further embodiment of a pince-nez according to the invention. The basic principles are the same as described above, but the lens 10 is detachably arranged in this embodiment. To have the lens detachable may be advantageous in various situations. For instance if the lens 10 has an asymmetrical cut/refraction it is an advantage to have it detachable since it may then be possible to position it identically in front of each one of the left and right eye respectively, if at the same time the outer edges of the lenses are symmetrical, i.e. the lens 10 may then be positioned in exactly the same way irrespective on which side it is attached to the frame 30. A further advantage is that such a pince-nez may be used with lenses having different Refraction, such that a first lens 10 with a first refraction may be used for one of the eyes and a second lens 10', having different refraction, (preferably having exactly the same outer shape) may be used for the other eye. Further such an arrangement makes it also possible for several individuals, for instance in the same family, to use the same pince-nez. According to a preferred embodiment of arranging the lens 10 detachably, there is provided an annular frame 30 to the pivotal arm 15 of the bridge portion 12. The frame 30 has an annular form that is symmetrical both in relation to the horizontal axis and in relation to the vertical axis. Also the lens 10 has a corresponding shape. Thanks to such an arrangement the lens 10 may be positioned within the frame 30 in two different positions, i.e. rotated 180°. To safely hold the lens 10 within the frame 30 there are arranged four, spread apart, support devices 31, 32, 33, 34. Two of these support devices 31, 32 include ferromagnetic material to interact with magnets 35, 36 that are attached to the glass of the lens 10 (preferably the magnets 35, 36 are embedded in the glass). The other two support devices 33, 34 form passive supports positioned in between the other two supports 31, 32, such that four scattered support points are provided, to safely support the lens 10. Accordingly the lens 10 is easily attached within the frame 10 merely by putting it close to its correct position, whereupon the magnets 35, 36 will be attracted to each one of the corresponding support devices 31, 32, whereafter lens 10 will be correctly positioned within the frame 30. As has been described above the arm 15 may be pivoted along an axis (here a horizontal axis) to be positioned in the frame 30 on the other side of the bridge piece 12. Again also in this position the lens 10 may be positioned in exactly the same manner, by being rotated 180° in the vertical plane to be positioned exactly as on the other side of the bridge piece 12.

Even though the invention has been described above with reference to two preferred embodiments illustrated in the drawings, the invention is restricted only by the scope of the appended claims. For example, although neither described above nor shown, it would be possible, if desired, to modify the embodiment of FIG. 2 by using a rigid, arched bridge piece 12 extending in the plane of movement of the arm 15' and making the two slender portions 13 and 14 extend parallel to each other equal distances upward and downward in the plane of the lens 10. In a front view of the modified pince-nez, the arrangement of the bridge piece 12 and the two mutually parallel slender portions 13, 14 would form a structure in the shape of an H. The attachment of the slender portions 13, 14 to the bridge piece 12 would be by means of springs, suitably coil springs. Both ends of each slender portion would be provided with nose pads 20, 21, and the arm 15' would not have to be pivotable but could be fixed to the bridge piece 12. Provided that the arm 15' is attached to the lens at the same level as arm 15 in FIG. 1, the single lens pince-nez could just be turned upside down and attached over the nose to place the single lens before the other eye to permit applying make-up on the half of the face earlier obstructed. Further it is evident that the embodiment shown in FIGS. 3 may also be varied, e.g. by increasing or decreasing (i.e. 3 is a minimum of points to have stability) the number of support devices and/r the number of magnets (i.e. 1 being a minimum).

INDUSTRIAL APPLICABILITY

It is obvious from the above description that the single lens pince-nez of the present invention is very suitable for use as make-up "glasses", since it does not obstruct the applying of make-up on one side of the face of the wearer of the "glasses", and is comfortable to wear thanks to its low weight.

I claim:

1. A single lens pince-nez, comprising:
   a bridge member arranged to extend over the bridge of the nose of a person and engage, at least the sides of, the bridge of the nose to position the pince-nez; and
   a single lens attached to the bridge member in a position located in front of one eye of the person when the person wears the pince-nez, wherein the single lens may be pivoted from a first position in front of one eye of the person to a second position in front of the other eye of the person.

2. A single lens pince-nez as according to claim 1, wherein the bridge member includes a bridge piece and two spring-loaded nose pads, one for each side of the nose, attached to the bridge piece.

3. A single lens pince-nez according to claim 2, wherein the nose pads are silicone pads.

4. A single lens pince-nez according to claim 2, wherein each of the nose pads are mounted at a free end of a slender portion of the bridge piece, the slender portion being sufficiently resilient to provide the spring action.

5. A single lens pince-nez according to claim 2, wherein the bridge piece consists of a beta titanium alloy.

6. A single lens pince-nez according to claim 1, further comprising an arm having two ends, one end being pivotally attached to the bridge member and the other end of the arm being connected, directly or indirectly to the single lens, whereby the single lens may be pivoted from a first position in front of one eye of the person to a second position in front of the other eye of the person.

7. A single lens pince-nez according to claim 6, wherein the arm presents a light-weight structure and consists of a beta titanium alloy.

8. A single lens pince-nez according to claim 6, wherein the pivotal attachment includes a substantially horizontal pivotal axis, so that the pivotal movement of the single lens when a person carries the pince-nez takes place in a substantially vertical plane.

9. A single lens pince-nez according to claim 6, wherein the pivotal attachment includes a substantially vertical pivotal axis, so that the pivotal movement of the single lens when a person carries the pince-nez takes place in a substantially horizontal plane.

10. A single lens pince-nez according to claim 7, wherein said arm is telescopically arranged.

11. A single lens pince-nez according to claim 1, wherein the single lens consists substantially of glass having a refractive index on the order of 1.9.

12. A single lens pince-nez according to claim 6, wherein the single lens is frameless, by being directly attached to said arm.

13. A single lens pince-nez according to claim 1, wherein the single lens is detachably arranged to said bridge member by means of a frame.

14. A single lens pince-nez as according to claim 13, wherein said single lens is arranged with at least one magnetic device to magnetically attach the lens to a portion connected to said bridge member.

* * * * *